March 15, 1932. E. S. CORNELL, JR 1,850,049
PIPE FITTING AND METHOD OF MAKING THE SAME
Filed Jan. 29, 1932   3 Sheets-Sheet 1
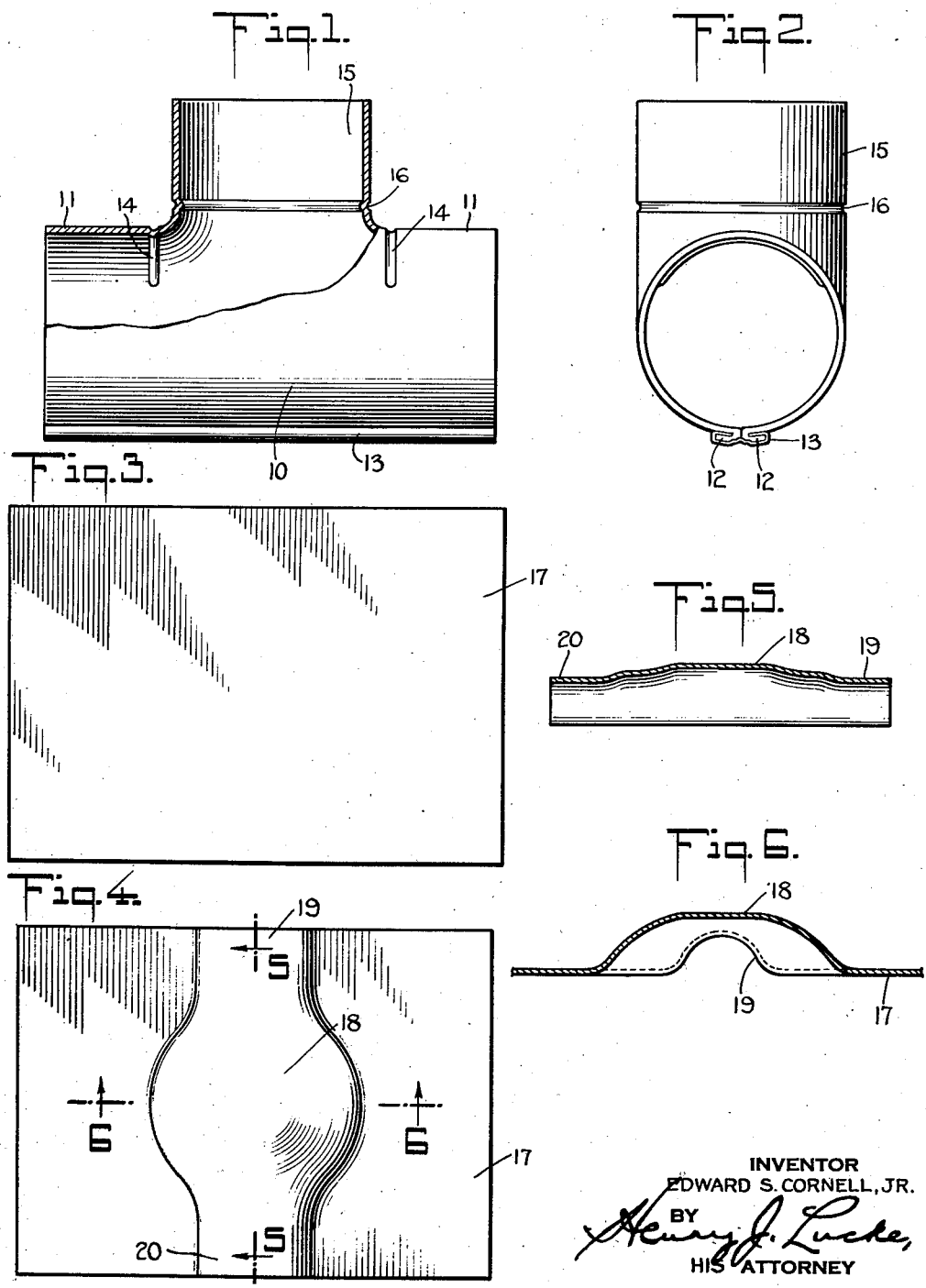

March 15, 1932. E. S. CORNELL, JR 1,850,049
PIPE FITTING AND METHOD OF MAKING THE SAME
Filed Jan. 29, 1932 3 Sheets-Sheet 2
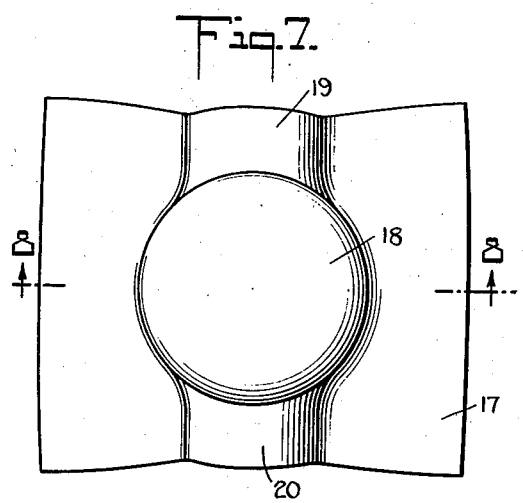
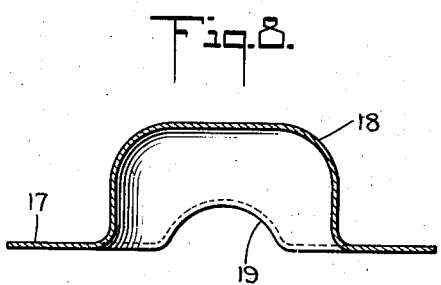
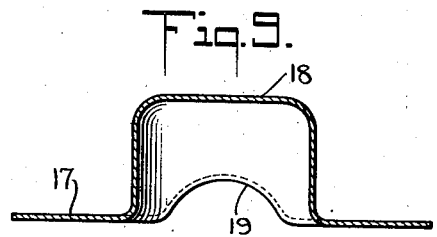
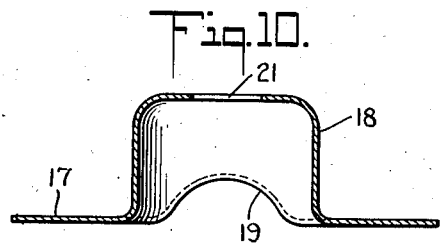
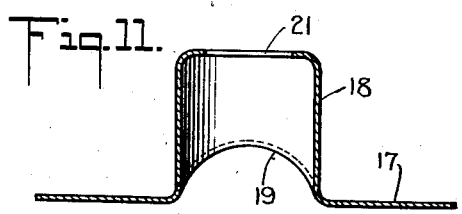
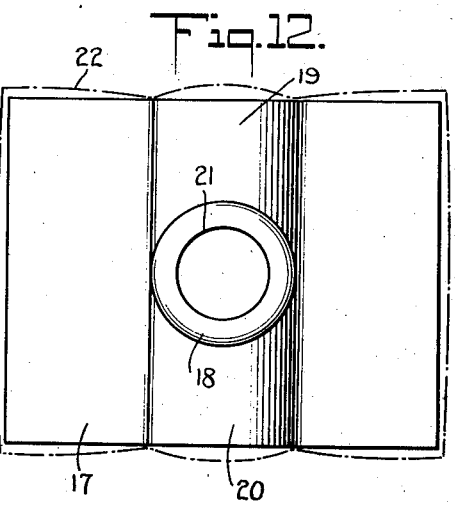
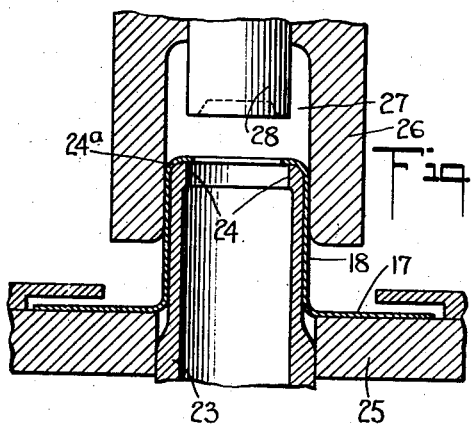
INVENTOR
EDWARD S. CORNELL, JR.
BY
HIS ATTORNEY March 15, 1932. E. S. CORNELL, JR 1,850,049
PIPE FITTING AND METHOD OF MAKING THE SAME
Filed Jan. 29, 1932   3 Sheets-Sheet 3
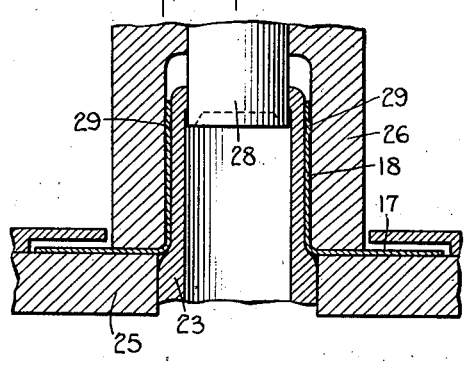
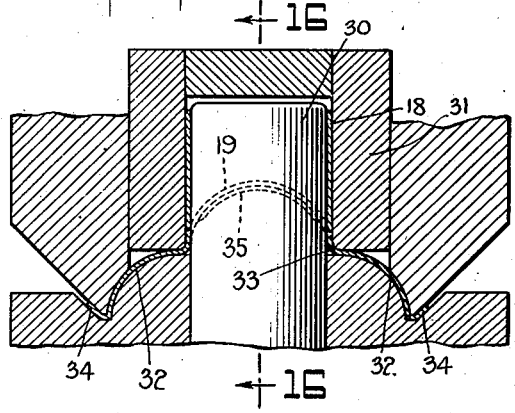
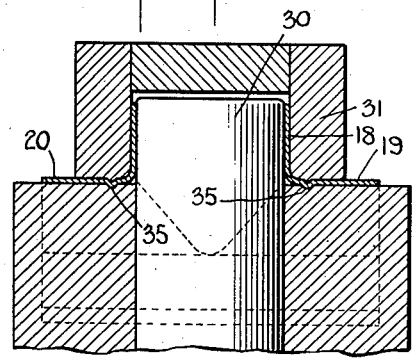
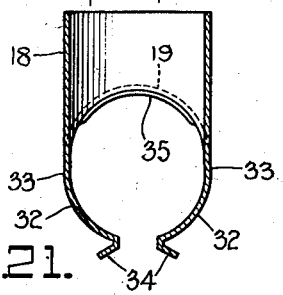
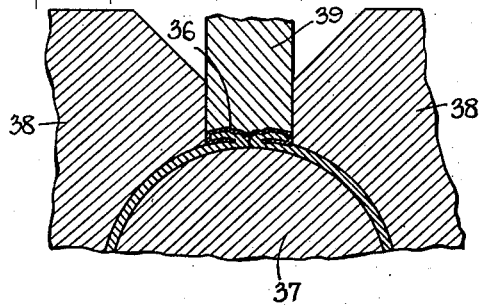
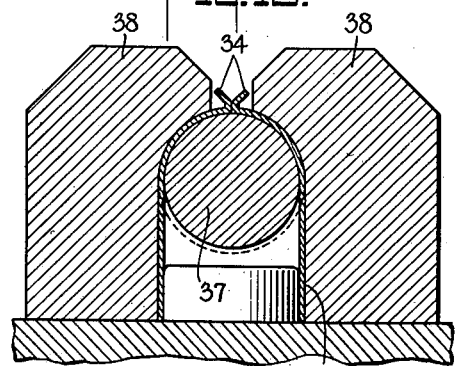
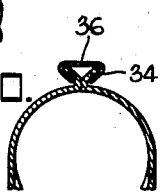
INVENTOR
EDWARD S. CORNELL, JR.
BY
HIS ATTORNEY Patented Mar. 15, 1932

1,850,049

UNITED STATES PATENT OFFICE

EDWARD S. CORNELL, JR., OF LARCHMONT, NEW YORK

PIPE FITTING AND METHOD OF MAKING THE SAME

Application filed January 29, 1932. Serial No. 589,595.

My present invention relates to pipe fittings and more particularly to an improved pipe fitting and method of manufacturing the same.

My invention is particularly directed to T and other metal pipe fittings, the body of which is provided with a longitudinal passage and a lateral passage communicating therewith, which, as complete elements, are made from sheet metal by blanking, drawing, folding and/or mechanical steps or operations to be hereinafter more fully described.

Among the advantages inherent in my improved article and the method of making the same is that of being able to form a tubular fitting such as a T to have its branch connector of sufficient length to provide proper security by sweating, soldering or brazing a pipe or tube thereto which it is impossible to make from a drawn pipe or tube, as well as the low cost of production of the individual fitting element, the utilization of the element as a complete unit by the plumber or other installer, the avoidance of punching, reaming and/or other mechanical operations on the wall of a pipe or tube for forming a branch or other joint, etc., and particularly the adaptability of fittings embodying my invention with the use of soldering, brazing, or other securing means or materials.

Preferably, my T is formed of sheet metal of the thickness of the magnitude of several hundredths of an inch to provide sufficient strength against puncture or other rupture, but preferably of insufficient thickness for forming a thread or like sealing joint.

The securement by sweating, soldering, and/or brazing of the various forms of my fitting to one or more pipes or tubes is had by either exterior or interior telescopic relation therewith, the mutually telescoping parts being dimensioned to provide a sufficiently snug fit with a minute clearance to effect the capillary or other surface flow of the securing medium during the stage of heating of the mutually telescoping parts and to entrap the congealed securing medium upon cooling of such medium and of the mutually telescoping parts to attain self-sealing securement.

An essential feature of my invention as relating to the improved fitting is that each individual fitting is derived as a complete fitting unit and is of a form adapted to be secured to a pipe or tube to provide a continuous and full-sized flow passage from said pipe or tube to one or more connecting pipes or tubes.

A further feature of my invention resides in the novel method of forming a pipe fitting, such as a T, from a single piece of sheet metal wherein the thickness of the walls is substantially equal at any point of the fitting and which ordinarily, and preferably, is manufactured of material identical with the material of the piping to be associated therewith.

A still further feature of my invention is the improved method of making a pipe fitting from a single sheet of wrought metal, such as sheet copper, in which the length of the lateral is of ample length to provide a sufficient contact area with the pipe to be fitted therewith to rigidly support the same and have a sweat joint of sufficient area to positively insure against leakage due to any pressure within the safe limits of the pipe and fitting.

Further features and objects of the invention will be more fully understood from the following detailed description and the accompanying drawings.

In carrying out my invention, I take a rectangular sheet of metal, such as wrought sheet copper of appropriate thickness and form therein on one face thereof a projection which is to ultimately form the lateral and simultaneously form a semi-cylindrical projection on each side of the central projection, such semi-circular projections extending from the central projection to the respective opposite edges of the sheet, and the two projections on each side of the central projection are substantially in alignment with each other. By this method of procedure, I am enabled to draw from the sheet of metal, and by succeeding operations, a lateral longer than has heretofore been possible in this art.

After the series of drawing operations have been performed on the sheet of metal, there is formed on one face thereof, not only the lateral projection, but also one-half of the body and one half of the end members, and after this is done the succeeding operations are utilized to form the other half of the body and end members and bring the edges thereof together to form the complete fitting.

My present application is a continuation in part of my copending applications, Serial No. 555,032, filed August 4, 1931, entitled Sheet metal pipe fittings, and Serial No. 555,033, filed August 4, 1931, entitled Method and production of sheet metal pipe fittings.

In the accompanying drawings;

Figure 1 is a side elevation, partly broken away, of a pipe fitting, such as a T, embodying my invention;

Fig. 2 is an end elevation of Fig. 1;

Fig. 3 is a plan view of a blank of sheet metal from which the pipe fitting in Figs. 1 and 2 is made;

Fig. 4 is a plan view of the blank shown in Fig. 3 after the first step in the process of forming the pipe fitting has been carried out;

Fig. 5 is a sectional elevation on the line 5—5 of Fig. 4;

Fig. 6 is a sectional elevation on the line 6—6 of Fig. 4;

Fig. 7 is a plan view of the blank after the second step in the process has been performed thereon;

Fig. 8 is a sectional elevation on the line 8—8 of Fig. 7, and designed to illustrate the diameter and height of the lateral projection being formed on the blank illustrated originally in Fig. 3;

Fig. 9 is a sectional elevation on the line 8—8 of Fig. 7, but showing the increased length and reduced diameter of the projection formed on the blank after the third step in the process has been performed thereon.

Fig. 10 is a sectional elevation on the line 8—8 of Fig. 7 and similar to Fig. 9, but showing the central portion of the end of the lateral projection blanked out in the fourth step in the operation of forming the pipe fitting;

Fig. 11 is a view also on the line 8—8 of Fig. 7 showing the further increase in height and the further decrease in the diameter of the lateral projection formed on the sheet of metal after the fifth step of the process has been performed thereon;

Fig. 12 is a plan view of the sheet of metal shown in Fig. 11, and illustrates the sixth step or the step of trimming the sheet of metal to regular rectangular shape, preparatory to completing the fitting to be made therefrom;

Fig. 13 illustrates the seventh step in the improved process of forming pipe fitting from a single sheet of metal, showing the sheet as trimmed in Fig. 12 and in position on a combined punch and die, and showing the position thereof in the die preparatory to performing the step of trimming the end of the projection and forming the trimmed end into a tubular member to add to the length of the lateral projection;

Fig. 14 is a view similar to Fig. 13 showing the sheet of metal after the trimming and tube forming operation has been performed thereon;

Fig. 15 is a sectional elevation through a punch and die showing the step of forming the skirts of the blank to a radius determined by the radius of a semi-cylindrical projection formed in a sheet of metal and also showing the step of bending the edges of the skirt;

Fig. 16 is a sectional side elevation of a blank in position in a forming die showing the step of bending the skirts of the blank into approximately cylindrical form and also the step of forming the stop element in the longitudinal end members;

Fig. 17 is an end view of Fig. 16;

Fig. 18 is an end view of the pipe fitting in position in closing dies, preparatory to enclosing the bent skirt edges in a grooved member;

Fig. 19 is a perspective view of the grooved, bent-end enclosing member;

Fig. 20 is an end view of a portion of the pipe fitting showing the enclosing grooved member in position, and Fig. 21 illustrates a die and a punch for compacting the enclosing member and the bent-over skirt edges into substantially a unitary structure.

Referring to the drawings, there is shown in Figs. 1 and 2 a T pipe fitting, which is illustrative of my invention and which has been manufactured according to my improved process. This T comprises a body 10 provided with a longitudinal passage and with a lateral passage extending outwardly therefrom and at an angle thereto. At the ends of the body in alignment with each other and in alignment with the longitudinal axis of the body are end members 11 which are, of course, formed integral with the body 10. The body 10 and end members 11 are formed from the same sheet of metal. The material adjacent the edges thereof is bent over as indicated at 12 in Fig. 2 and such bent-over portion is enclosed between the folds of a grooved member 13 and the metal of the folds 12 and grooved member 13 are compacted together to form a sealed joint at the meeting edges of the skirting of the sheet of metal composing the body 10 and ends 11.

Adjacent to the junction of each end member 11 with the body 10 is a stop 14, preferably formed in the metal itself, which as shown, may be in the form of an extension on the interior of the longitudinal bore to act as a stop for a pipe which is to fit within the end members 11. Formed integral with the body 10 at the end of the lateral passage is a neck member 15, there being provided at the junction of such neck member 15 with the body an annular groove 16 which, in the form shown, results in a circular inwardly extending stop disposed on the interior of the neck member 15. Or the stop 16 may be in the form of an outwardly-extending ring or other like annular member to serve as a stop for pipes designed to fit over the exterior of the neck member 15.

The entire structure shown in Fig. 1 is formed of a single sheet of wrought metal in the manner to be hereinafter described and it will be noted from an inspection of Figs. 1 and 2 that the length of the neck member 15 may be less than, exceed, or may be equal to that of the end members 11 to thereby insure sufficient soldered or sweated connecting area between the neck member 15 and the pipe or tube with which it is to be associated.

The improved process by which the pipe fitting illustrated in Figs. 1 and 2, and above described, is manufactured has its various steps illustrated in the remaining figures of the drawings and in which Fig. 3 shows a blank 17 of wrought sheet metal such as sheet copper of any desired dimensions as regards length and breadth. The blank 10 is placed in a press and subjected to an operation to form therein on one side thereof, and preferably simultaneously, a central projection 18 and arcuate projections 19 and 20, which arcuate projections are in alignment with each other and which merge into the projection 18, such aligned arcuate projections 19 and 20 extending from opposite sides of the projection 18 and extending outward to opposite edges of the blank 17. Preferably, for convenience, the operations of forming the projection 18 and arcuate projections 19 and 20 are performed simultaneously. The blank 17, as illustrated in Figs. 4, 5 and 6, is now subjected to other bending and forming operations, preferably also simultaneously, for the purpose of enlarging the size of the arcuate projections 19 and 20 and for extending the length of the projection 18, while simultaneously reducing the diameter of projection 18. Fig. 8 is a section on the line 8—8 of Fig. 7 and shows the increase in length of the projection 18 as well as the decrease in the diameter thereof as compared with the like showing in Fig. 6, for example. The increase in the size of the arcuate projections 19 and 20 and the height of the projection 18 and the reduction in diameter thereof is further carried out by an additional step as illustrated in Fig. 9, where the results of such steps will be clearly apparent upon comparison with the showing in Fig. 8. Fig. 9 shows the practical maximum results that may be obtained from this method of procedure and Fig. 10 illustrates the structure of Fig. 9, after being subjected to a further operation of cutting out a circular blank 21 from the closed end, i. e. top of the projection 18 and preparatory to utilizing the metal in the end of such blank 18, as a means for further extending the length thereof. The blank as now appearing in Fig. 10 is subjected to a further operation of reducing the diameter of the central projection 18 while considerably extending the length thereof, it being noted that the hole formed by the removal of the circular blank 21 is enlarged by causing the metal of the end of the projection 18 to flow into the circular portion of the projection 18, thereby adding materially to the length of such projection.

The blank 17 has now been processed to the point where the central projection 18 is of substantially the desired size and before completing the pipe fitting from the point shown in Fig. 8, it is necessary to trim the edges of the blank 18 to restore the same to substantially rectangular form, this step being shown in Fig. 12, where the portion lying between the full outline and the dot and dash outline 22 is the portion removed. Referring to Fig. 11, it will be noted that the arcuate portion 19 and, therefore, necessarily the arcuate portion 20 is now practically of semi-cylindrical form and as the diameter of the central projection 18 is substantially that of the desired finished diameter, it will be noted that the joining portion of the projection 18 with the now semi-cylindrical projections 19 and 20 terminates at a point to define a skirt in the blank 17 on each side of the aligned semi-cylindrical projections 19 and 20.

Referring now to Fig. 13, there is shown a press device consisting of a stationary member 23, provided with a cylindrical cutting edge 24 at its upper end and with a rounded outer end 24a. This stationary member 23 is associated with a spring-pressed base 25 and over the member 23 and resting on the spring member 25 is a blank 17 processed as shown in Fig. 11 and trimmed as shown in Fig. 12. The outer diameter of the member 23 at its upper end is slightly less than the desired finished internal diameter of the central projection 18 and which is to result in the neck member 15 as shown in Figs. 1 and 2, in the finished article. Slidably mounted with respect to the stationary member 23 is a hollow member 26 provided with a cylindrical chamber 27, which encloses the upper end of the stationary member 23 and the projection 18 mounted thereon. Extending into the cylindrical chamber 27 and forming part of the member 26 is a cutting punch 28 which cooperates with the cutting edge 24 of the member 23 to remove surplus material from the hole formed in the member 18 by removal of the blank 21 as illustrated in Fig. 10. The lower end of the member 26 engages with the blank 17 and forces the same downward against the yielding effect of the member 25. In this downward movement, the cutting punch 28 first blanks out the surplus metal at the upper end of the projection 18 and continued downward movement causes the ends of the members 26 to engage with the blank 17, which is forced downwardly and into the position shown in Fig. 14 where it will be noted that the major portion of the round end of the projection 18 is now incorporated in the length of the projection 18 and further it will be obvious that the outer diameter of the projection 18 is now slightly smaller than the desired outer diameter of such projection. This reduction in the diameter of the central projection 18 below the desired finished size is done to provide for a subsequent operation. The operation as described with regard to Figs. 13 and 14 is known as a burring operation and in such operation, there is invariably thrown up in the resulting cylindrical member at the added end thereto and formed from the rounded portion of the projection 18 into a cylindrical portion, a groove 29 on the interior of the projection 18. The groove 29 is, therefore, removed by forcing the projection 18 over a mandrel 30 of the desired internal size of the projection 18 while holding the projection 18 on the outside in a sleeve 31 and simultaneously with such operation there is formed on the skirt of the blank 17 arcuate portions 32, such arcuate portions being on a radius equal to the radius of the semi-cylindrical projections 19 and 20. (See Fig. 15.) The semi-cylindrical projections 19 and 20 and the skirts 32 are connected through the reverse groove 33 in such blank 17. Also simultaneously with the formation of the arcuate portions 32, there is formed adjacent the edge of each of the skirts a bent-out portion 34 which latter are to form means for receiving a grooving holding member. The blank 17 processed to the form shown in Fig. 15 is now subjected to a further forming operation in which stop members 35 are formed at the junction point of the semi-cylindrical projections 19 and 20 with the body of the fitting. Fig. 17 shows an end view of Fig. 16 and is self-explanatory, it being noted that the bent portions 34 in the skirts of the blank 17 are now approaching each other and that the reverse curved portions 33 have been practically straightened out, resulting in the arcuate portions 32 being moved toward each other and defining substantially a circular passage. The circular passage is further and definitely defined by subjecting the blank to a further pressing operation, as shown in Fig. 18, where it will be noted that the bent-over portions 34 are brought into practical engagement with each other and that the straight portions 33 are ironed out until a completely circular, tubular member is formed. In Fig. 19 is shown in perspective a grooved holding member 36 which is now slipped over the bent-over portions 34 as shown in Fig. 20, after which the article is placed in a press on a mandrel 37 (see Fig. 21) and held on such mandrel by jaws 38 which act as side holding members for the grooved member 36 and which provide a vertical passage or guideway for a plunger 39 which moving downward compresses the metal of the grooved member 36, the bent portions 34, and the body of the blank 17 into a compact mass and it has been found that this mass is compacted to the extent that there is practically a cold weld between the metals comprising the grooved member 36 and the blank 17.

The above described step and the resulting compacted-welded joint is described in detail and is specifically claimed in my co-pending application, Serial No. 584,021, filed December 31, 1931, and entitled Process of forming sheet metal pipe fittings and resulting product.

From the above, it will appear that a T or like fitting embodying my invention comprises a body having a longitudinally extending passage, one opening of such longitudinal passage communicates with one hollow end member, the opposite opening of which communicates with the opposite hollow end member, the body further has a passage extending laterally of the longitudinally-extending passage, the opening of the laterally-extending passage communicating with the hollow neck member.

It will be further observed that the dimension of the hollow neck member is of relatively great length to afford rigid securement of the end of a pipe or a pipe fitting by sweated connection therewith. In such sweated connection, assuming the end of the pipe or of a pipe fitting to be internally relative to the hollow neck member, in which instance the hollow neck member is provided with a smooth inner face, such smooth face extends from the edge of the hollow neck member to a stop located substantially coincident with the junction of the lateral passage and the longitudinal passage through the body. Similarly, assuming also the end of a pipe or pipe fitting to be telescoped internally relatively to each of the hollow end members, each end member is provided internally with a smooth face, which extends inwardly from the edge of the hollow end member to a stop located therein.

Without limiting the scope of my invention I cite the following specific embodiments of commercial forms of my T construction, assuming the longitudinal end members and the neck member to be of the same diameters:

| Diameter of openings of T | Length of neck member from its edge to its stop | Length of each end member from its edge to its stop | Gauge of thickness of original blank and wall of body |
|---|---|---|---|
| ⅜ inch | ½ inch | ½ inch | .035 inch |
| ½ inch | ⅝ inch | ⅝ inch | .040 inch |
| ¾ inch | ⅞ inch | ⅞ inch | .045 inch |
| 1 inch | 1 inch | 1 inch | .050 inch |
| 1¼ inch | 1 1/16 inch | 1 1/16 inch | .055 inch |
| 1½ inch | 1⅛ inch | 1⅛ inch | .060 inch |
| 2 inch | 1 5/32 inch | 1 5/32 inch | .070 inch |

In the above stated, and other commercial embodiments of my invention, and as is illustrated in the accompanying drawings, the smooth faces of the hollow neck member, and the two end members, respectively, to which the sweated, soldered or brazed connections are made are of substantially uniform bore or diameter, whether the connection is made telescopically internally or externally, the bore or diameter of each such smooth face being dimensioned to provide for a clearance of proper magnitude for attaining capillary and/or surface flow of the bonding medium.

Whereas I have described my invention by reference to specific forms thereof, it will be understood that various changes or modifications may be made without departing from the spirit of the invention.

I claim:

1. The improved method of forming a pipe fitting having a longitudinal passage and a transverse passage in its body which comprises subjecting a substantially flat sheet of wrought metal to a series of drawing operations to form on one face thereof three projections substantially in alignment, the two outer of said projections being of substantially semi-cylindrical configuration, said outer projections extending respectively substantially to opposite edges of the sheet, then elongating the central one of said projections while simultaneously diminishing its cross-sectional area and also increasing the extent of said outer projections from the respective opposite edges, the above operations being effected while maintaining substantially the thickness of the metal throughout the sheet, and then finishing the sheet to the form of the pipe fitting.

2. The improved method of forming a pipe fitting having a longitudinal passage and a transverse passage in its body which comprises subjecting a substantially flat sheet of wrought metal to drawing operations to form on one face thereof three projections substantially in alignment, the central one of said projections being of substantially full cylindrical form, the two outer of said projections being of substantially semi-cylindrical configuration, said outer projections extending respectively substantially to opposite edges of the sheet, then elongating the central one of said projections while simultaneously diminishing its diameter and also increasing the extent and diameter of said outer projections from the respective opposite edges, the above operations being effected while maintaining substantially the thickness of the metal throughout the sheet, and then finishing the sheet to the form of the pipe fitting.

3. The improved method of forming a pipe fitting having a longitudinal passage and a transverse passage in its body which comprises subjecting a substantially flat sheet of wrought metal to drawing operations to form on one face thereof three projections substantially in alignment, the central one of said projections being of substantially full cylindrical form, the two outer of said projections being of substantially semi-cylindrical configuration, said outer projections extending respectively substantially to opposite edges of the sheet, then elongating the central one of said projections while simultaneously diminishing its diameter and also increasing the extent and diameter of said outer projections from the respective opposite edges, repeating the operations of elongation of and of reduction of diameter of the central projection and simultanously increasing the length and the diameter of the two outer projections, the above operations being effected while maintaining substantially the thickness of the metal throughout the sheet, and then finishing the sheet to the form of the pipe fitting.

4. The improved method of forming a pipe fitting having a longitudinal passage and a transverse passage in its body which comprises subjecting a substantially flat sheet of wrought metal to drawing operations to form on one face thereof three projections substantially in alignment, punching out the top of the central projection on an outline less than its full diameter and increasing the length of the central projection by cylindrically extending the thus uncut annular metal of the top, the two outer of said projections being of substantially semi-cylindrical configuration, said outer projections extending respectively substantially to opposite edges of the sheet, then elongating the central one of said projections while simultaneously diminishing its cross-sectional area and also increasing the extent of said outer projections from the respective opposite edges, and then expanding the central projection to finished size, the above operations being effected while maintaining substantially the thickness of the metal throughout the sheet, and then finishing the sheet to the form of the pipe fitting.

5. The improved method of forming a pipe fitting having a longitudinal passage and a transverse passage in its body which comprises subjecting a substantially flat sheet of wrought metal to drawing operations to form on one face thereof three projections substantially in alignment, punching out the top of the central projection on an outline less than its full diameter and increasing the length of the central projection by cylindrically extending the thus uncut annular metal of the top, the two outer of said projections being of substantially semi-cylindrical configuration, said outer projections extending respectively substantially to opposite edges of the sheet, then elongating the central one of said projections while simultaneously diminishing its cross-sectional area to bring its diameter smaller than the desired finished size, and also increasing the extent of said outer projections from the respective opposite edges, and then expanding the central projection to finished size, the above operation being effected while maintaining substantially the thickness of the metal throughout the sheet, and then finishing the sheet to the form of the pipe fitting.

6. A threadless pipe fitting comprising a body having a passage extending longitudinally therethrough, hollow end members at each end opening of the longitudinal passage and in substantial alignment with each other and with the longitudinal passage, and a relatively long hollow neck member communicating at its inner end with said longitudinal passage, said body and said hollow neck member being of integral wrought metal of substantially uniform and relatively small dimensioned wall thickness, and said hollow neck member having a length substantially equal to each hollow end member, said neck member having a substantially smooth face of substantially uniform diameter substantially throughout the area of said smooth face to afford a rigid sweated telescoped connection with an end of a pipe or pipe fitting.

7. A threadless pipe fitting comprising a body having a passage extending longitudinally therethrough, hollow end members at each end opening of the longitudinal passage and in substantial alignment with each other and with the longitudinal passage, a relatively long hollow neck member communicating at its inner end with said longitudinal passage, said body and said hollow neck member being of integral wrought metal of substantially uniform and relatively small dimensioned wall thickness, said hollow neck member having a length substantially equal to each of said hollow end members, said neck member having a substantially smooth face of substantially uniform diameter substantially throughout the area of said smooth face to afford a rigid sweated telescoped connection with an end of a pipe or pipe fitting, and a bead disposed on said smooth face of said neck member serving as a stop for limiting the toward movement of the end of such pipe or pipe fitting relative to said neck member.

8. A threadless pipe fitting comprising a body having a passage extending longitudinally therethrough, hollow end members at each end opening of the longitudinal passage and in substantial alignment with each other and with the longitudinal passage, and a relatively long hollow neck member communicating at its inner end with said longitudinal passage, said body and said hollow neck member being of integral wrought metal of substantially uniform and relatively small dimensioned wall thickness, said hollow neck member having a length substantially equal to each of said hollow end members, said hollow end members and said hollow neck member each having a substantially smooth face to afford a rigid sweated telescoped connection with the end of a pipe or pipe fitting, each of said smooth faces having a substantially uniform diameter substantially throughout its area, and a bead at each of the smooth faces serving as a stop for limiting the toward movement of the end of such pipe or pipe fitting relative to the body.

In testimony whereof I have signed this specification this 25th day of January, 1932.

EDWARD S. CORNELL, Jr.